(12) United States Patent
Dyckerhoff et al.

(10) Patent No.: US 7,983,290 B2
(45) Date of Patent: *Jul. 19, 2011

(54) PRESERVING THE ORDER OF PACKETS THROUGH A DEVICE

(75) Inventors: Stefan Dyckerhoff, Palo Alto, CA (US); Pankaj Patel, Cupertino, CA (US); Pradeep Sindhu, Los Altos Hills, CA (US); Ashok Krishnamurthi, San Jose, CA (US); Hann-Hwan Ju, San Jose, CA (US); Ramalingam K Anand, San Jose, CA (US); Dennis C Ferguson, Mountain View, CA (US); Chang-Hong Wu, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/731,653

(22) Filed: Mar. 25, 2010

(65) Prior Publication Data

US 2010/0177777 A1    Jul. 15, 2010

Related U.S. Application Data

(60) Continuation of application No. 11/332,402, filed on Jan. 17, 2006, now Pat. No. 7,715,449, which is a division of application No. 09/751,454, filed on Jan. 2, 2001, now Pat. No. 7,016,367, which is a continuation-in-part of application No. 09/534,838, filed on Mar. 24, 2000, now Pat. No. 7,139,282.

(51) Int. Cl.
*H04L 12/56* (2006.01)
*H04J 1/16* (2006.01)

(52) U.S. Cl. ......... 370/428; 370/252; 370/468; 709/203

(58) Field of Classification Search ............... 370/252, 370/428, 468; 709/203
See application file for complete search history.

(56) References Cited

U.S. PATENT DOCUMENTS

| | | | |
|---|---|---|---|
| 5,335,325 | A | 8/1994 | Frank et al. |
| 5,506,841 | A | 4/1996 | Sandquist |
| 5,710,650 | A | 1/1998 | Dugan |
| 5,757,771 | A | 5/1998 | Li et al. |
| 5,905,725 | A | 5/1999 | Sindhu et al. |
| 5,909,440 | A | 6/1999 | Ferguson et al. |
| 5,953,314 | A | 9/1999 | Ganmukhi et al. |
| 6,009,075 | A | 12/1999 | Roberts et al. |

(Continued)

OTHER PUBLICATIONS

Co-pending U.S. Appl. No. 11/332,402, filed Jan. 17, 2006 entitled "Preserving the Order of Packets Through a Device" by Stefan Dyckerhoff et al., 61 pages.

*Primary Examiner* — John Pezzlo
(74) *Attorney, Agent, or Firm* — Harrity & Harrity, LLP

(57) ABSTRACT

A network device includes one or more sprayers, multiple packet processors, and one or more desprayers. The sprayers receive packets on at least one incoming packet stream and distribute the packets according to a load balancing scheme that balances the number of bytes of packet data that is given to each of the packet processors. The packet processors receive the packets from the sprayers and process the packets to determine routing information for the packets. The desprayers receive the processed packets from the packet processors and transmit the packets on at least one outgoing packet stream based on the routing information.

16 Claims, 16 Drawing Sheets

U.S. PATENT DOCUMENTS

| | | | |
|---|---|---|---|
| 6,092,178 | A | 7/2000 | Jindal et al. |
| 6,122,281 | A | 9/2000 | Donovan et al. |
| 6,263,368 | B1 | 7/2001 | Martin |
| 6,272,522 | B1 | 8/2001 | Lin et al. |
| 6,324,580 | B1 | 11/2001 | Jindal et al. |
| 6,327,622 | B1 | 12/2001 | Jindal et al. |
| 6,359,900 | B1 | 3/2002 | Dinakar et al. |
| 6,385,209 | B1 | 5/2002 | Skirmont et al. |
| 6,404,752 | B1 | 6/2002 | Allen, Jr. et al. |
| 6,424,621 | B1 | 7/2002 | Ramaswamy et al. |
| 6,446,146 | B1 | 9/2002 | Yamaguchi et al. |
| 6,567,902 | B1 | 5/2003 | Padmanabhan et al. |
| 6,580,715 | B1 * | 6/2003 | Bare .................. 370/396 |
| 6,601,084 | B1 | 7/2003 | Bhaskaran et al. |
| 6,636,515 | B1 | 10/2003 | Roy et al. |
| 6,643,719 | B1 | 11/2003 | Baker |
| 6,646,983 | B1 | 11/2003 | Roy et al. |
| 6,650,641 | B1 | 11/2003 | Albert et al. |
| 6,728,492 | B1 | 4/2004 | Baroncelli |
| 6,741,615 | B1 | 5/2004 | Patwardhan et al. |
| 6,751,743 | B1 | 6/2004 | Theodoras, II et al. |
| 6,754,174 | B1 | 6/2004 | Ben-Zur et al. |
| 6,754,217 | B1 | 6/2004 | Ahn |
| 6,791,947 | B2 | 9/2004 | Oskouy et al. |
| 6,834,049 | B1 | 12/2004 | Tomar et al. |
| 6,834,057 | B1 | 12/2004 | Rabenko et al. |
| 6,895,018 | B1 | 5/2005 | Klish, II |
| 6,907,541 | B1 | 6/2005 | Padmanabhan et al. |
| 7,016,367 | B1 | 3/2006 | Dyckerhoff et al. |
| 7,139,282 | B1 | 11/2006 | Dyckerhoff et al. |
| 7,164,698 | B1 | 1/2007 | Krishnamurthi et al. |
| 2006/0050690 | A1 * | 3/2006 | Epps et al. .................. 370/359 |

* cited by examiner

PRESERVING THE ORDER OF PACKETS THROUGH A DEVICE

RELATED APPLICATION

This application is a continuation of U.S. application Ser. No. 11/332,402, filed Jan. 17, 2006, now U.S. Pat. No. 7,715,449 issued May 11, 2010, which is a divisional of U.S. application Ser. No. 09/751,454, filed Jan. 2, 2001, now U.S. Pat. No. 7,016,367, issued Mar. 21, 2006, which claims priority under 35 U.S.C. §120 as a continuation-in-part of U.S. application Ser. No. 09/534,838, filed Mar. 24, 2000, now U.S. Pat. No. 7,139,282, issued Nov. 21, 2006, which are all hereby incorporated by reference.

BACKGROUND OF THE INVENTION

A. Field of the Invention

The present invention relates generally to routing systems and, more particularly, to systems and methods for allocating bandwidth for the processing of packets within a router.

B. Description of Related Art

Conventional networks typically include routers that route packets from one or more sources to one or more destinations. A packet is a format in which data of variable size can be transmitted through a network. A router is a switching device that receives packets containing data or control information at input ports and, based on destination or other information included in the packets, routes the packets through output ports to the destinations or intermediary destinations. Conventional routers determine the proper output port for a particular packet by evaluating header information included in the packet.

Conventional routers include buffers to support a particular bandwidth. If the input bandwidth exceeds the bandwidth of the router, the router may drop data or packets. The amount of input bandwidth may depend on a number factors, including the input line rate, the speed of the output determination process, and the blocking characteristics of the switching mechanisms of the router. Input bandwidth also relates to the processing power of the router. The processing power typically depends on the size of the memory (i.e., bigger and faster systems require larger memory capacities) and the ability of the router to determine where to route packets.

A key problem in designing routers is making them scale to larger aggregate bandwidths. To process a larger amount of bandwidth in a single conventional router, the size and configuration of the router typically has to be modified or redesigned. The process of modifying a router to increase bandwidth capability usually entails tedious design processes with the risk that the new design will not perform as intended or integrate well with other routers in the network, the outlay of resources (both monetary and human), as well as time delays. Building larger routers is often difficult due to hard technology limits on the integrated circuits the routers use. As a result of long development times and costs for redesigning an entire router, Internet service providers often cannot keep up with the increase in bandwidth demand.

Therefore, there exists a need for systems and methods that increase the bandwidth for processing of packets in a router.

SUMMARY OF THE INVENTION

Systems and methods, consistent with the present invention, address this and other needs by providing mechanisms for allocating bandwidth among packet processors in a router, thereby effectively increasing the amount of bandwidth the router is capable of handling without dropping data or packets.

In accordance with the purpose of the invention as embodied and broadly described herein, a network device includes one or more sprayers, multiple packet processors, and one or more desprayers. The sprayers receive packets on at least one incoming packet stream and distribute the packets according to a load balancing scheme that balances the number of bytes of packet data that is given to each of the packet processors. The packet processors receive the packets from the sprayers and process the packets to determine routing information for the packets. The desprayers receive the processed packets from the packet processors and transmit the packets on at least one outgoing packet stream based on the routing information.

In another implementation consistent with the present invention, a bandwidth divider, connected to multiple packet processors, includes at least one receive interface, a shared memory, and multiple transmit interfaces. The receive interface receives packets from at least one incoming packet stream. The shared memory stores the packets received by the receive interface. The transmit interfaces transmit the packets stored in the shared memory to the packet processors in a manner that balances a number of bytes of packet data transmitted to each of the packet processors.

In yet another implementation consistent with the present invention, a system for distributing packets evenly to multiple packet processors includes at least one receive interface, at least one stream flow controller, and multiple transmit interfaces. The receive interface receives packets on at least one incoming packet stream. The stream flow controller corresponds to the at least one incoming packet stream and assigns the packets to the packet processors so as to balance a number of bytes of the packets assigned to each of the packet processors. The transmit interfaces transmit the packets to the packet processors based on the assignments by the stream flow controller.

In a further implementation consistent with the present invention, a method for distributing packets evenly to multiple packet processors, includes receiving a plurality of packets on at least one incoming packet stream; assigning the packets to the packet processors so as to balance a number of bytes of the packets assigned to each of the packet processors; and transmitting the packets to the packet processors using the assignments.

In another implementation consistent with the present invention, a system for preserving an order of packets through a device includes a scheduling data buffer, a scheduling data queue, and a scheduler. The scheduling data buffer temporarily stores packet information corresponding to each of multiple received packets. The scheduling data queue stores the packet information for ones of the received packets based on their dispatch times. The scheduler preserves the order of the packets through the device by determining the dispatch time for each of the received packets and scheduling the received packets for transmission at the corresponding dispatch times.

In yet another implementation consistent with the present invention, a method for preserving an order of packets through a system includes receiving a plurality of packets; determining a dispatch time for each of the packets using one of a time stamp of a beginning of the packets and a time stamp of an end of the packets; and scheduling the packets for transmission at the corresponding dispatch times.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods, consistent with the present invention, increase the input bandwidth of a router by allocating bandwidth among multiple packet processors of the router and preserve the ordering of packets through the router.

Exemplary Router Configuration

Figure 1:
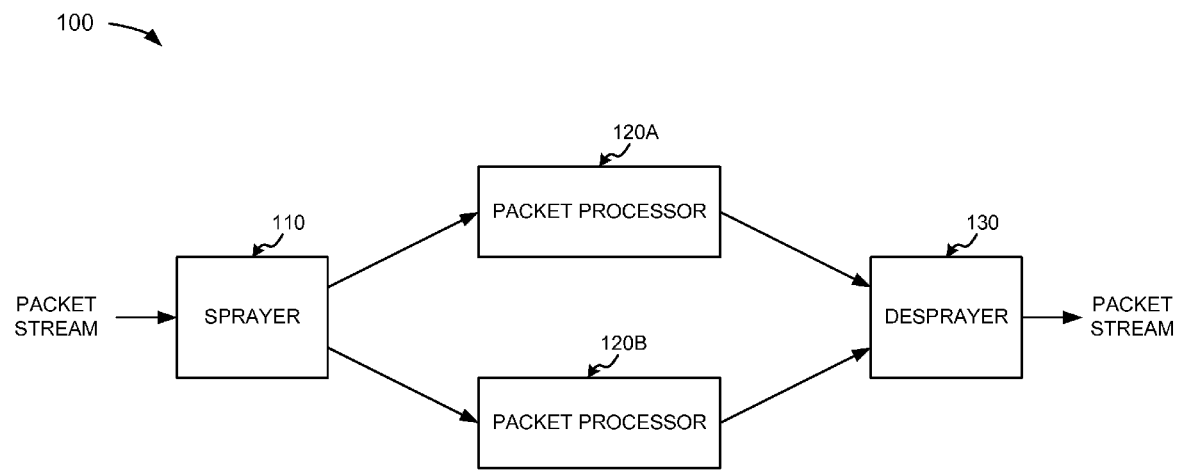
FIG. 1 is a diagram of an exemplary router configuration consistent with the present invention.

FIG. 1 is a diagram of an exemplary router 100 consistent with the present invention. The router 100 may include a sprayer 110, multiple packet processors 120 (120A and 120B), and a desprayer 130. The sprayer 110 may include a bandwidth divider that receives an incoming packet stream containing one or more packets and distributes the packets to the packet processors 120A and 120B.

The packet processors 120 may include packet forwarding engines that process the packets to forward the packets through the router 100. For example, the packet processors 120 may analyze the contents of a packet and, using routing and/or forwarding tables, identify the output port through which to transmit the packet. The packet processors 120 may attach an identifier to the packets to identify the output port. The desprayer 130 may include a bandwidth combiner that receives the processed packets from the packet processors 120A and 120B and transmits the packets on an outgoing packet stream.

Figure 2:
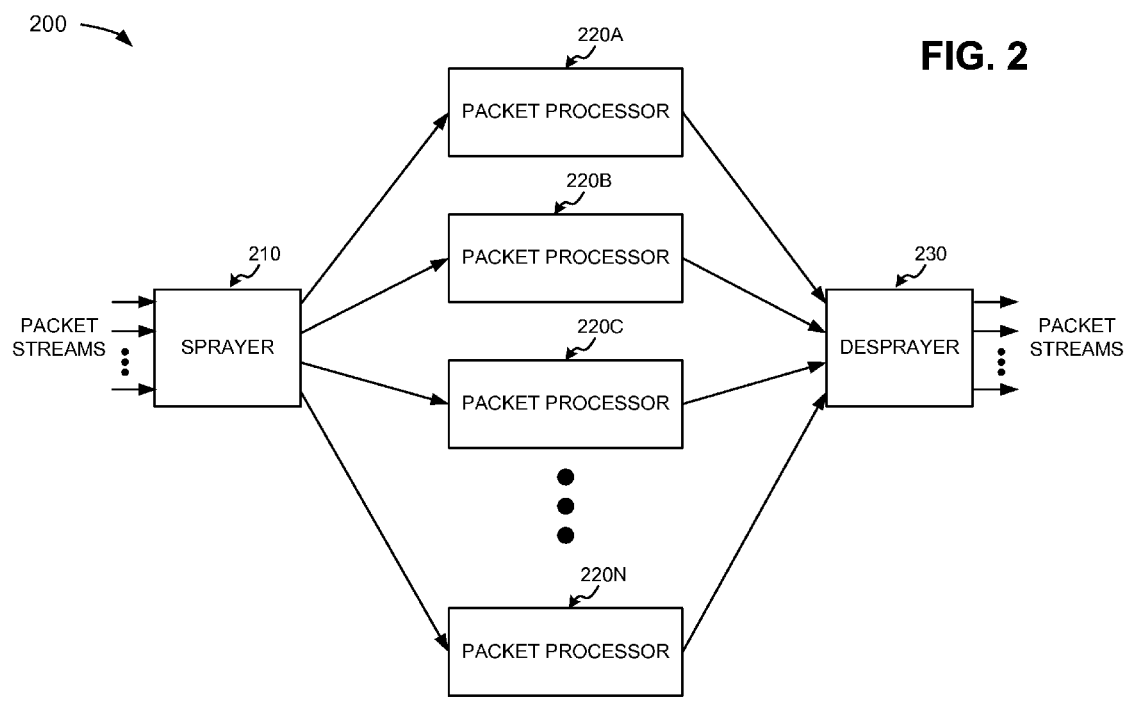
FIGS. 2 and 3 are exemplary diagrams of alternate router configurations consistent with the present invention.

FIG. 1 illustrates a very simple router configuration. In practice, the router may have more of these components and/or other components. For example, FIG. 2 is an exemplary diagram of an alternate router 200 consistent with the present invention. The router 200 may include a sprayer 210, packet processors 220 (220A, 220B, 220C, . . . , 220N), and a desprayer 230. In this case, the sprayer 210 may receive multiple incoming packet streams, each containing one or more packets and distribute the packets to the packet processors 220A-220N.

The packet processors 220 may process the packets to forward the packets through the router 200. For example, the packet processors 220 may analyze the contents of a packet to identify the output port through which to transmit the packet. The desprayer 230 may receive the processed packets from the packet processors 220A-220N and transmit the packets on outgoing packet streams, as instructed by the packet processors 220.

Figure 3:
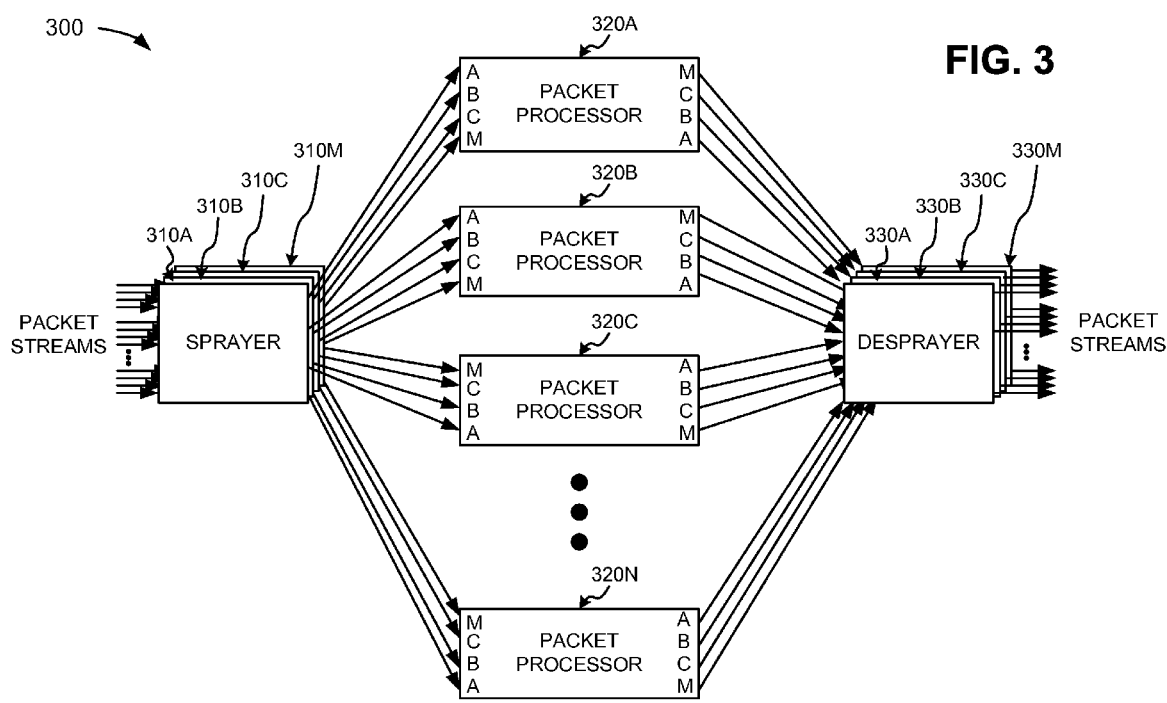

FIG. 3 is another exemplary diagram of an alternate router 300 consistent with the present invention. The router 300 may include multiple sprayers 310 (310A, 310B, 310C, . . . , 310M), packet processors 320 (320A, 320B, 320C, . . . , 320N), and desprayers 330 (330A, 330B, 330C, . . . , 330M). In this implementation, each of the sprayers 310 may receive multiple incoming packet streams, each containing one or more packets and distribute the packets to the packet processors 320A-320N. Each of the sprayers 310A-310M may, for example, connect to the same port of each of the packet processors 320. In other words, sprayer 310A may connect to port A of packet processor 320A, 320B, 320C, . . . , 320N; sprayer 310B may connect to port B of packet processor 320A, 320B, 320C, . . . , 320N; etc.

The packet processors 320 may process the packets to forward the packets through the router 300. For example, the packet processors 320 may analyze the contents of a packet to identify the output port through which to transmit the packet. Each of the desprayers 330 may receive the processed packets from the packet processors 320A-320N and transmit the packets on outgoing packet streams, as instructed by the packet processors 320. Each of the desprayers 330A-330M may connect to the same port of each of the packet processors 320. In other words, desprayer 330A may connect to port A of packet processor 320A, 320B, 320C, . . . , 320N; desprayer 330B may connect to port B of packet processor 320A, 320B, 320C, . . . , 320N; etc.

Exemplary Packaging

Figure 4:
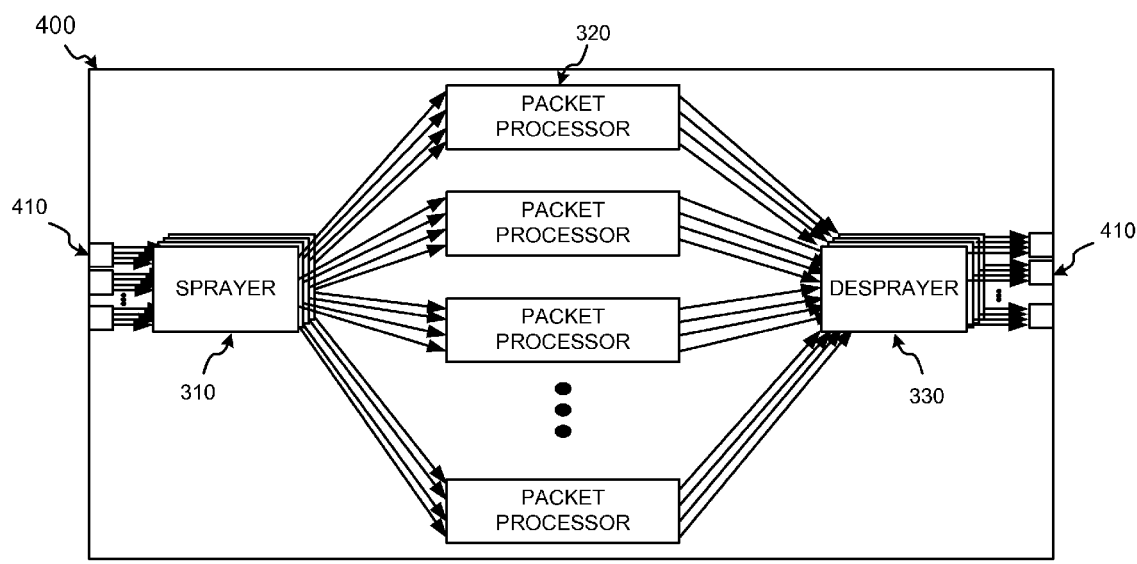
FIG. 4 is an exemplary diagram of a router integrated on a single chip according to an implementation consistent with the present invention.

The router 100, 200, and 300 may be packaged in a number of different ways. For example, the sprayer(s) 110, 210, and 310, packet processors 120, 220, and 320, and desprayer(s) 130, 230, and 330 may be integrated on one or more chips. FIG. 4 is an exemplary diagram of the router 300 integrated on a single chip 400 according to an implementation consistent with the present invention. In this implementation, the sprayers 310, packet processors 320, and desprayers 330 may include application-specific integrated circuits (ASICs). Alternatively, the packet processors 320 may include a processing device, such as a processor, and an associated memory. The sprayers 310 and desprayers 330 may communicate with other devices and/or systems off-chip via terminals 410.

Figure 5:
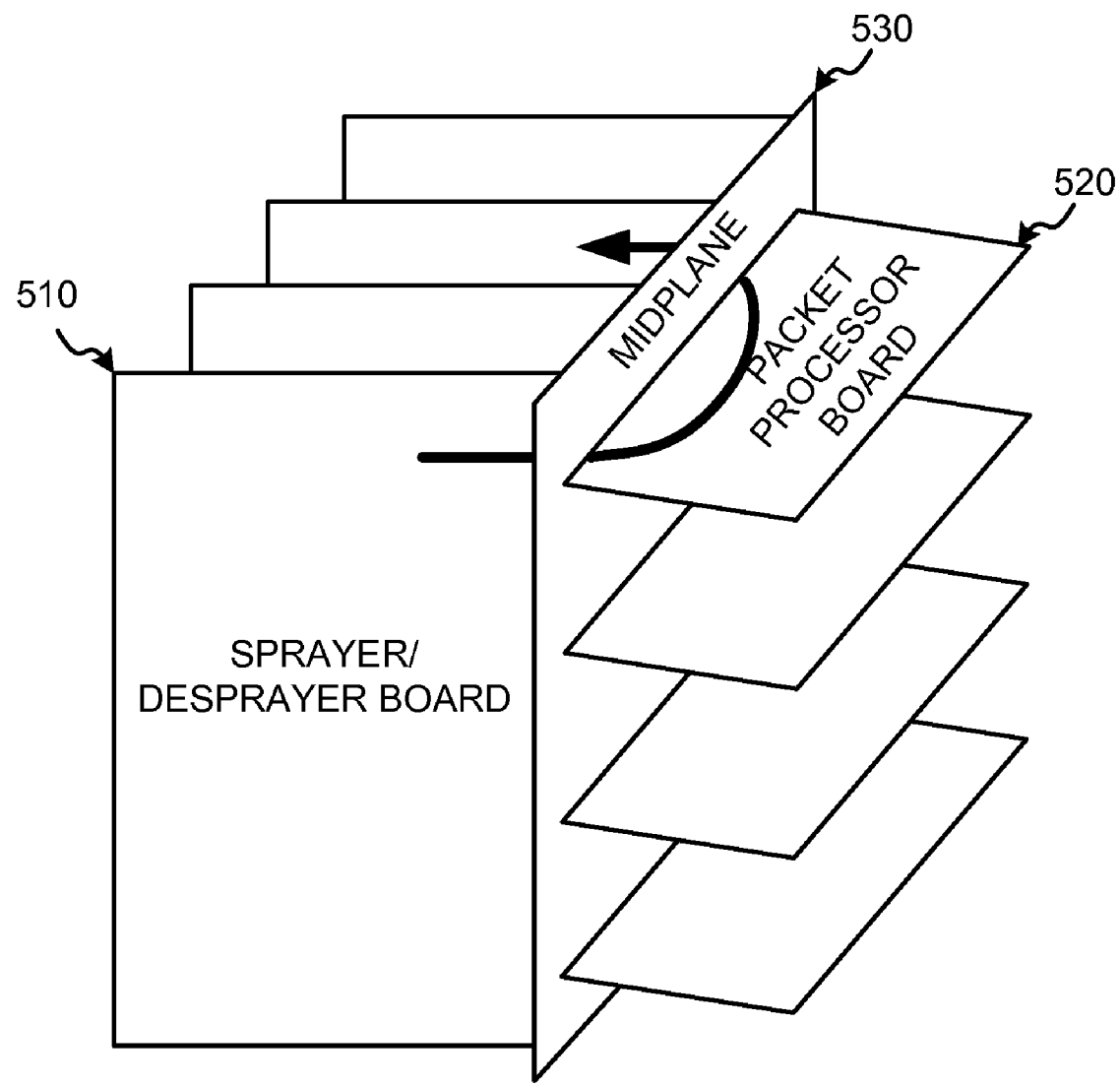
FIG. 5 is an exemplary diagram of a router provided on separate boards according to an alternate implementation consistent with the present invention.

In an alternative implementation consistent with the present invention, the sprayer(s) 110, 210, and 310, packet processors 120, 220, and 320, and desprayer(s) 130, 230, and 330 may be provided on separate chips and/or separate boards. For example, FIG. 5 is an exemplary diagram of the router 300 provided on separate boards 510 and 520 according to this alternate implementation consistent with the present invention. In this implementation, each of the boards 510 includes a pair of chips: a sprayer 310 chip and a desprayer 320 chip; and each of the boards 520 includes one or more chips making up the packet processor 320. The sprayer/desprayer boards 510 may connect to the packet processor boards 520 via a midplane 530. The midplane 530 may permit any of the sprayer/desprayer boards 510 to communicate with any of the packet processor boards 520, and vice versa.

Exemplary Sprayer Configuration

Figure 6:
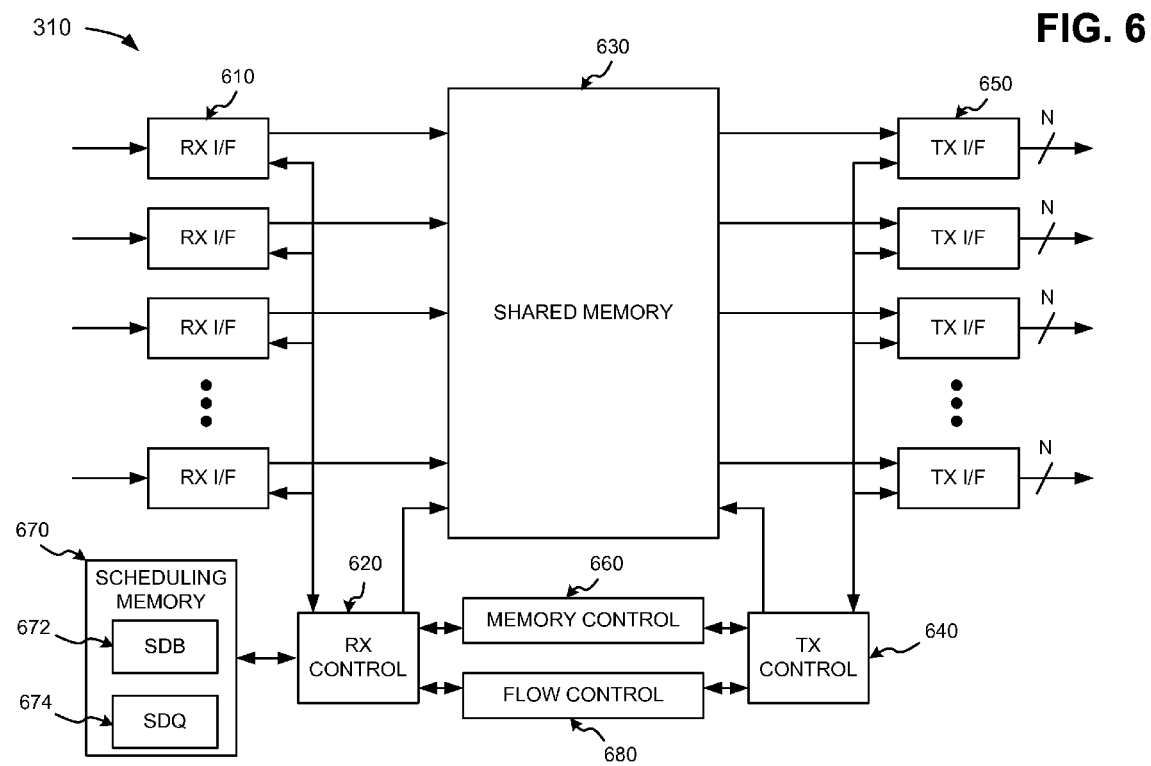
FIG. 6 is an exemplary diagram of a sprayer of FIGS. 1-3 according to an implementation consistent with the present invention.

FIG. 6 is an exemplary diagram of the sprayer 310 according to an implementation consistent with the present invention. It should be understood that the sprayers 110 and 210 may be similarly configured. The sprayer 310 may include receive interfaces (RX I/F) 610, receive (RX) controller 620, shared memory 630, transmit (TX) controller 640, transmit interfaces (TX I/F) 650, memory control 660, scheduling memory 670, and flow control 680.

Each of the receive interfaces 610 may include interface logic that receives a corresponding packet stream, temporarily buffers the packets included in the stream, and writes the packets to shared memory 630 under control of the receive controller 620. The receive controller 620 may include logic, such as an ASIC, that divides received packets into cells of a predetermined size (e.g., 32 bytes) and stores them in queues within the shared memory 630. The receive controller 620 may chain the cells of a packet together to form a linked list within the shared memory 630. The receive controller 620 may also chain entire packets together within a logical queue of the shared memory 630.

In an implementation consistent with the present invention, the receive controller 620 may include a scheduler that delays transmission of certain packets to preserve the order of packets through the router 300. In other words, the scheduler delays certain packets so that packets are transmitted from the router 300 in the same order in which they were received by the router 300. In some implementations consistent with the present invention, the scheduler is an entity separate from the receive controller 620.

Figure 7:
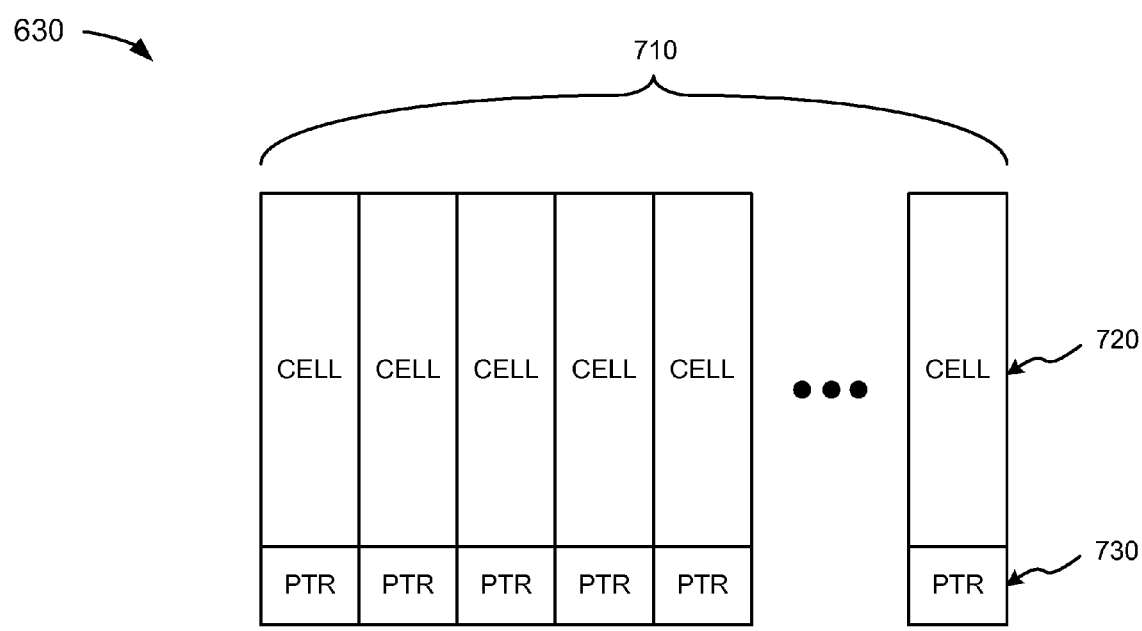
FIG. 7 is an exemplary diagram of the shared memory of FIG. 6 according to an implementation consistent with the present invention.

The shared memory 630 may include one or more memory devices, such as a multiple port Static Random Access Memory (SRAM), configured as a number of logical queues to store packets. FIG. 7 is an exemplary diagram of the shared memory 630 according to an implementation consistent with the present invention. The shared memory 630 may include a number of logical queues. For example, there may be a logical queue associated with each of the incoming packet streams and/or each of the outgoing packet streams. A logical queue may include one or more cell memories 710. Each of the cell memories 710 may include a cell portion 720 and a pointer portion 730. The cell portion 720 may store data of a cell of a packet. The pointer portion 730 may store a pointer to a next cell in the packet or a first cell in a next packet.

Figure 8:
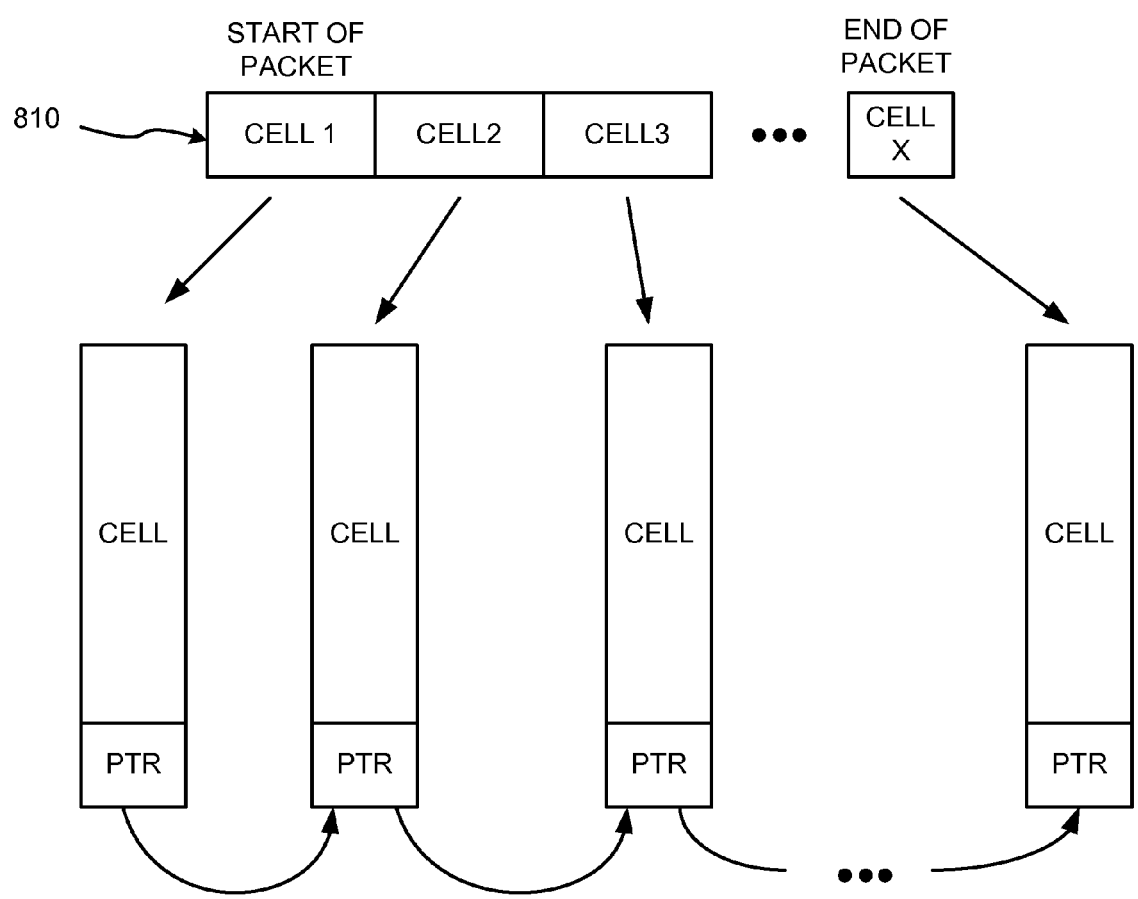
FIG. 8 illustrates an example of a packet stored within a logical queue of the shared memory of FIG. 7.

FIG. 8 illustrates an example of a packet stored within a logical queue of the shared memory 630. In this example, a packet 810 includes X cells, numbered cell 1, cell 2, cell 3, . . . , cell X. The cells of the packet 810 may be stored in the cell portion 720 of any cell memory 710 within the shared memory 630. As shown in the figure, the pointer within the pointer portion 730 links the cells of the packet 810 together within the shared memory 630 to form a linked list. In this way, the linked lists form logical queues of variable size.

Returning to FIG. 6, the transmit controller 640 may include logic, such as an ASIC, that reads packets from the shared memory 630 and determines the appropriate transmit interface 650 through which to transmit the packets. As described in more detail below, the transmit controller 640 controls the transmission of packets to balance the amount of work given to each of the packet processors 320 (FIG. 3). The transmit controller 640 operates under a load balancing scheme that gives approximately the same number of bytes of packet data to each of the packet processors 320.

Each of the transmit interfaces 650 may include interface logic that obtains packets from the shared memory 630 under control of the transmit controller 640, temporarily buffers the packets, and sends the packets on the corresponding outgoing packet stream. Each of the transmit interfaces 650 may transmit multiple outgoing packet streams. For example, there may be a separate outgoing packet stream to each of the packet processors 320 that corresponds to each of the incoming packet streams received by the receive interfaces 610. In other words, if there are N incoming packet streams, then each transmit interface 650 connects to N outgoing packet streams.

The memory control 660 may include mechanisms to aid the receive controller 620 and transmit controller 640 in the writing and reading of packets to and from the shared memory 630. For example, the memory control 660 may include a link memory, a free list, and a queue status memory. The link memory may contain the control information needed by the receive controller 620 to link cells of a packet and link packets of a logical queue. The free list may include a first-in first-out (FIFO) memory that stores a list of free cell memories 710 (FIG. 7) in the shared memory 630. The transmit controller 640 adds cell memory 710 pointers to the free list and the receive controller 620 removes cell memory 710 pointers from the free list. The queue status memory may store information for every logical queue in shared memory 630 to indicate whether the queue is empty.

The scheduling memory 670 may include a scheduling data buffer (SDB) 672 and a scheduling data queue (SDQ) 674 that are used to preserve the order of packets through the router 300. The scheduling data buffer 672 may include one or more buffers that provide a waiting space for packet data when an empty space cannot immediately be located in the scheduling data queue 674. The scheduling data queue 674 may include one or more buffers that store a list of packets sorted by the scheduled dispatch time. When an end of a packet is received by a receive interface 610, the scheduler within the receive controller 620 may store it in the scheduling data queue 674 instead of immediately storing it in the shared memory 630. The end of the packet may remain in the scheduling data queue 674 until its scheduled dispatch time.

Figure 9:
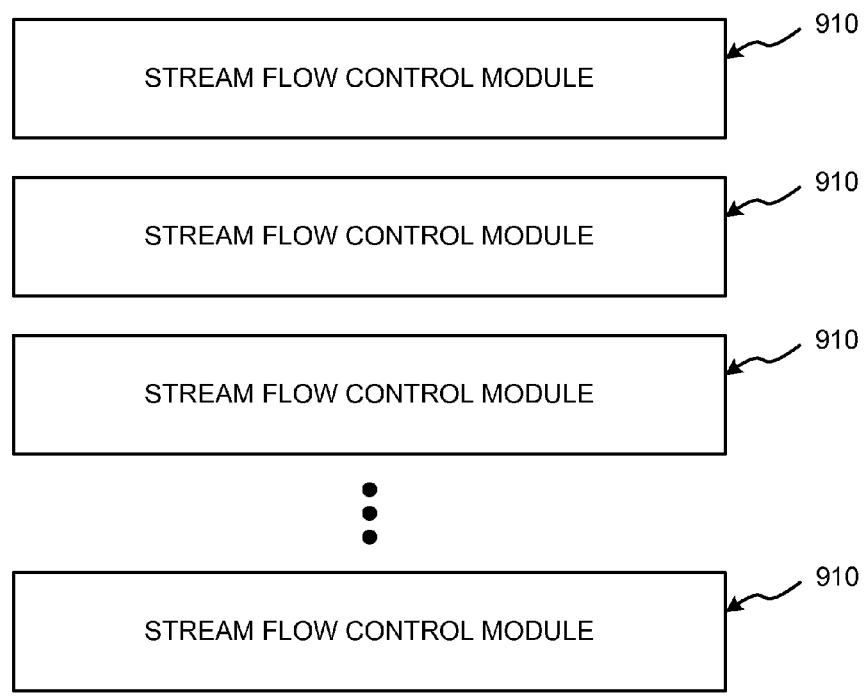
FIG. 9 is an exemplary diagram of the flow control of FIG. 6 according to an implementation consistent with the present invention.

The flow control 680 may include mechanisms that aid the transmit controller 640 in balancing the amount of work given to each of the packet processors 320. FIG. 9 is an exemplary diagram of the flow control 680 according to an implementation consistent with the present invention. The flow control 680 may include stream flow control modules 910. In this implementation, the number of stream flow control modules 910 corresponds to the number of incoming packet streams. Each of the stream flow control modules 910 may balance the amount of work from the corresponding incoming packet stream given to each of the packet processors 320.

Figure 10:
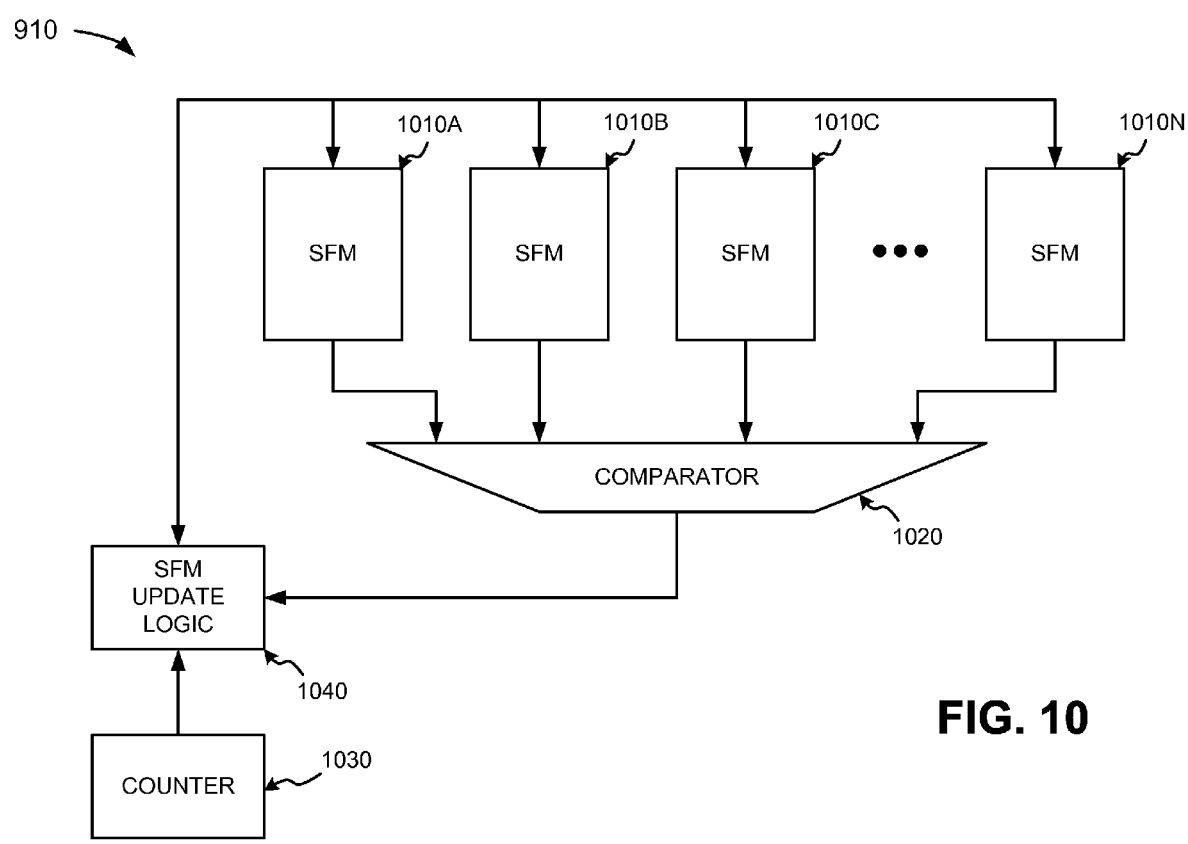
FIG. 10 is an exemplary diagram of a stream flow control module of FIG. 9 according to an implementation consistent with the present invention.

FIG. 10 is an exemplary diagram of a stream flow control module 910 according to an implementation consistent with the present invention. The stream flow control module 910 may include stream flow meters (SFMs) 1010 (1010A, 1010B, 1010C, . . . , 1010N, where N corresponds to the number N of packet processors 320), a comparator 1020, a counter 1030, and SFM update logic 1040. Each of the SFMs 1010 may include a memory that stores a value corresponding to the number of bytes that have been sent to the corresponding packet processor 320. The comparator 1020 may include a conventional comparator that compares the values stored in the SFMs 1010 to ultimately identify the packet processor 320 that has received the least number of bytes from the incoming packet stream.

The counter 1030 may include conventional counting logic that counts the number of bytes in each packet on the incoming packet stream. The SFM update logic 1040 may include logic that identifies the packet processors 320 to receive packets on the incoming packet stream, updates the value of the SFMs 1010 corresponding to the identified packet processors 320, and normalizes the values in the SFMs 1010. The SFM update logic 1040 may assign a packet to the packet processor 320 that has a corresponding SFM 1010 with the lowest value. The SFM update logic 1040 may then increment the value in the SFM 1010 by the packet size (i.e., the number of bytes determined by the counter 1030).

The SFM update logic 1040 may then normalize the SFMs 1010 by identifying the SFM 1010 with the lowest value (after one of the SFMs 1010 has been incremented) and subtracting this value from the values in all of the SFMs 1010. This way, the SFM 1010 that was identified as having the lowest value would now have a value of zero. The SFM update logic 1040 may then store the normalized values in the corresponding SFMs 1010.

Exemplary Desprayer Configuration

Figure 11:
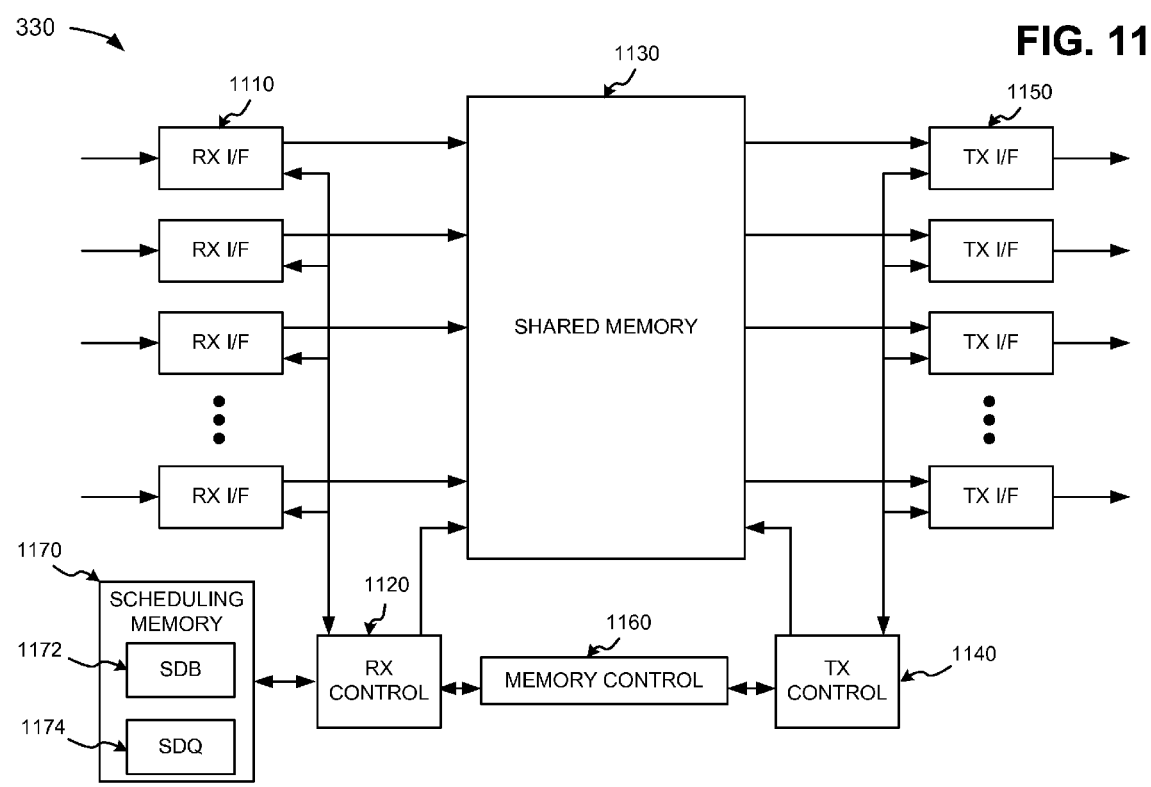
FIG. 11 is an exemplary diagram of a desprayer of FIGS. 1-3 according to an implementation consistent with the present invention.

FIG. 11 is an exemplary diagram of the desprayer 330 according to an implementation consistent with the present invention. It should be understood that the desprayers 130 and 230 may be similarly configured. The desprayer 330 may include receive interfaces 1110, receive controller 1120, shared memory 1130, transmit controller 1140, transmit interfaces 1150, memory control 1160, and scheduling memory 1170.

The receive interfaces 1110 may include interface logic that receives packets from the packet processors 320, temporarily buffers the packets, and writes the packets to shared memory 1130 under control of the receive controller 1120. The receive controller 1120 may include logic, such as an ASIC, that divides received packets into cells of a predetermined size (e.g., 32 bytes) and stores them in queues within the shared memory 1130. The receive controller 1120 may chain the cells of a packet together to form a linked list within the shared memory 1130, as described above with regard to FIGS. 7 and 8. The receive controller 1120 may also chain entire packets together within a logical queue of the shared memory 1130.

In an implementation consistent with the present invention, the receive controller 1120 may include a scheduler that delays transmission of certain packets to preserve the order of packets transmitted from the router 300. In other words, the scheduler may delay certain packets so that packets are transmitted from the router 300 in the same order in which they were received by the router 300.

The shared memory 1130 may include one or more memory devices, such as a multiple port SRAM, configured as a number of logical queues to store packets. The shared memory 1130 may be configured similar to the configuration described above with regard to FIGS. 7 and 8. The transmit controller 1140 may include logic, such as an ASIC, that reads packets from the shared memory 1130 and determines the appropriate transmit interfaces 1150 through which to transmit the packets. When the packet processors 320 process packets, the packet processors 320 may attach identifiers to the packets that identify the outgoing packet streams on which to transmit the packets. The transmit controller 1140 may use the identifiers to identify the transmit interfaces 1150 to transmit the packets.

Each of the transmit interfaces 1150 may include interface logic that obtains packets from the shared memory 1130 under control of the transmit controller 1140, temporarily buffers the packets, and sends the packets on the corresponding outgoing packet stream. Each of the transmit interfaces 1150 may transmit on a single or multiple outgoing packet streams. When transmitting on a single outgoing packet stream, the transmit interfaces 1150 may interleave transmission of packets from the different packet processors 320. The transmit interfaces 1150 may use a round robin technique or another technique.

The memory control 1160 may include mechanisms to aid the receive controller 1120 and transmit controller 1140 in the writing and reading of packets to and from the shared memory 1130. For example, the memory control 1160 may include a link memory, a free list, and a queue status memory. The link memory may contain the control information needed by the receive controller 1120 to link cells of a packet and link packets of a logical queue. The free list may include a FIFO memory that stores a list of free cell memories in the shared memory 1130. The transmit controller 1140 may add cell memory pointers to the free list and the receive controller 1120 may remove cell memory pointers from the free list. The queue status memory may store information for every logical queue in shared memory 1130 to indicate whether the queue is empty.

The scheduling memory 1170 may include a scheduling data buffer 1172 and a scheduling data queue 1174 that aid in preserving the order of packets transmitted from the router 300. The scheduling data buffer 1172 may include one or more buffers that provide a waiting space for packet data when an empty space cannot immediately be located in the scheduling data queue 1174. The scheduling data queue 1174 may include one or more buffers that store a list of packets sorted by the scheduled dispatch time. When an end of a packet is received by a receive interface 1110, the receive controller 1120 may store it in the scheduling data queue 1174 instead of immediately storing it in the shared memory 1130. The end of the packet may remain in the scheduling data queue 1174 until its scheduled dispatch time.

Exemplary Processing

Figure 12:
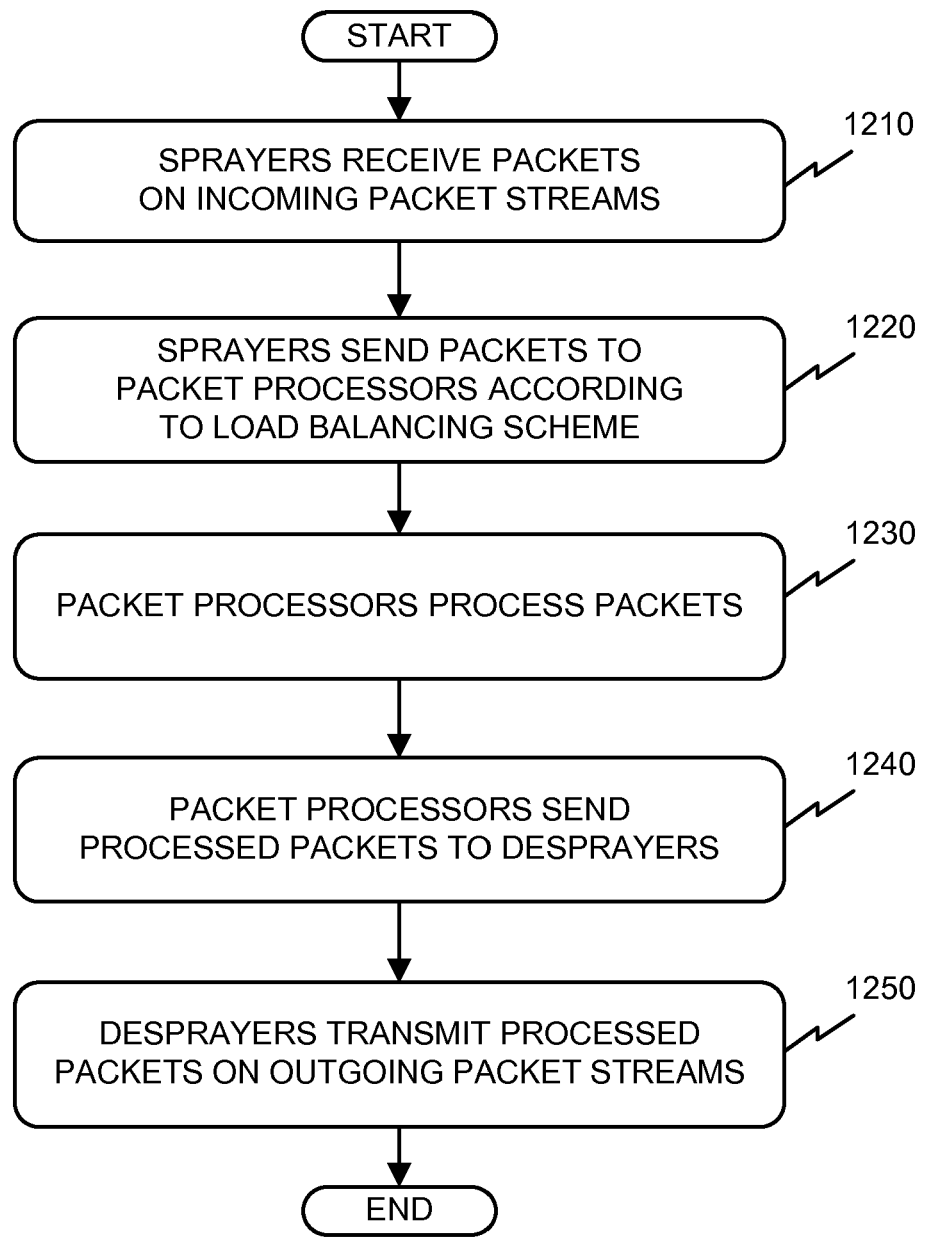
FIG. 12 is an exemplary flowchart of processing by the router of FIG. 3 according to an implementation consistent with the present invention.

FIG. 12 is an exemplary flowchart of processing by the router 300 (FIG. 3) according to an implementation consistent with the present invention. The routers 100 and 200 may perform similar processing. The processing may begin with the sprayers 310 receiving packets on the incoming packet streams [act 1210].

Figure 13:
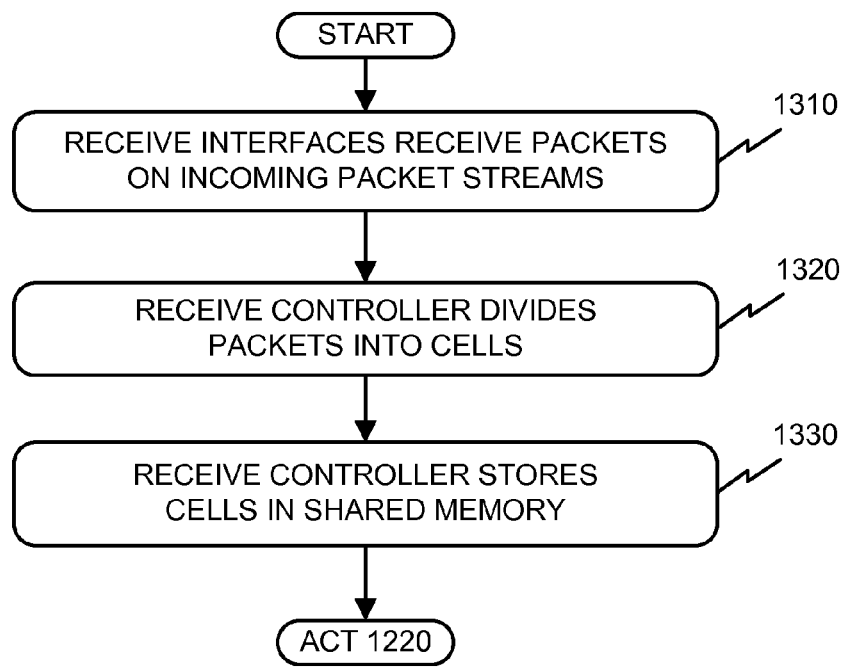
FIG. 13 is an exemplary flowchart of packet processing by the sprayers when receiving packets in an implementation consistent with the present invention.

FIG. 13 is an exemplary flowchart of packet processing by each of the sprayers 310 when receiving packets. The receive interfaces 610 (FIG. 6) may receive packets on the incoming packet streams [act 1310]. The receive controller 620 may divide the packets into cells of a predetermined size, such as 32 bytes [act 1320]. The receive controller 620 may then store the cells in shared memory 630 [act 1330]. To do so, the receive controller 620 may identify locations within the shared memory 630 to which to store the cells using information from the memory control 660, such as information stored in the free list. The receive controller 620 may then store the cells at the identified locations and link them together using pointers (see e.g., FIG. 8).

Figure 14:
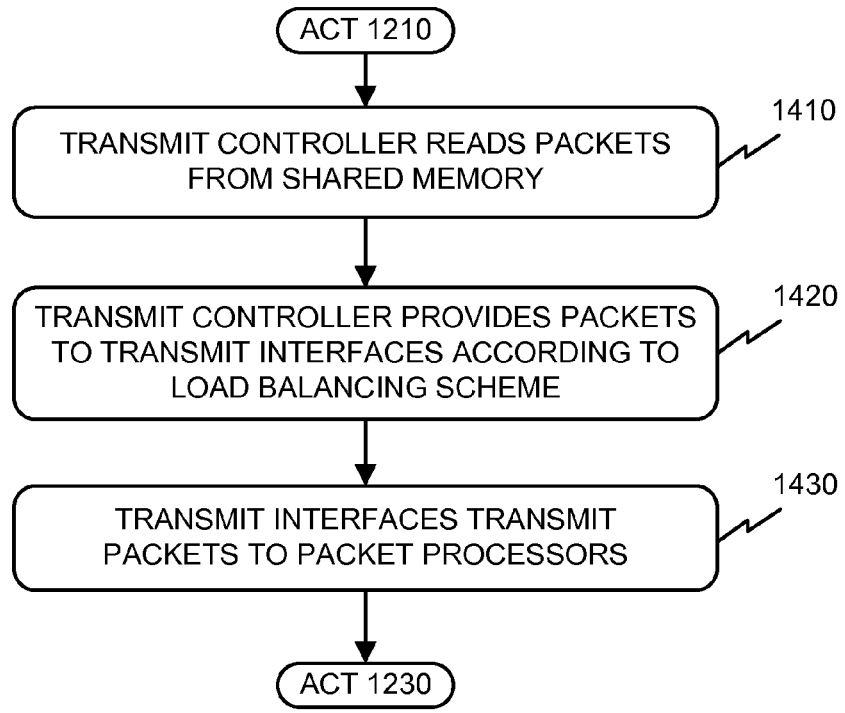
FIG. 14 is an exemplary flowchart of packet processing by the sprayers when sending packets to the packet processors in an implementation consistent with the present invention.

Returning to FIG. 12, the sprayers 310 may send the packets to the packet processors 320 according to a load balancing scheme [act 1220]. FIG. 14 is an exemplary flowchart of packet processing by each of the sprayers 310 when sending packets to the packet processors 320. The transmit controller 640 may read the packets from the shared memory 630 [act 1410]. The transmit controller 640 may then provide the packets to the transmit interfaces 650 for transmission to the packet processors 320 according to a load balancing scheme [act 1420].

In an implementation consistent with the present invention, the load balancing scheme provides approximately the same number of bytes of data to each of the packet processors 320. The packet processors 320 may process packets at approximately the same rate. So if the packet processors 320 receive an equal number of bytes of packet data, they should output the packets in the same order in which they were received. The sprayers 310 may take additional measures to assure the order of packets through the router 300, using, for example, the scheduling memory 1170. These additional measures are described in more detail below.

Figure 15:
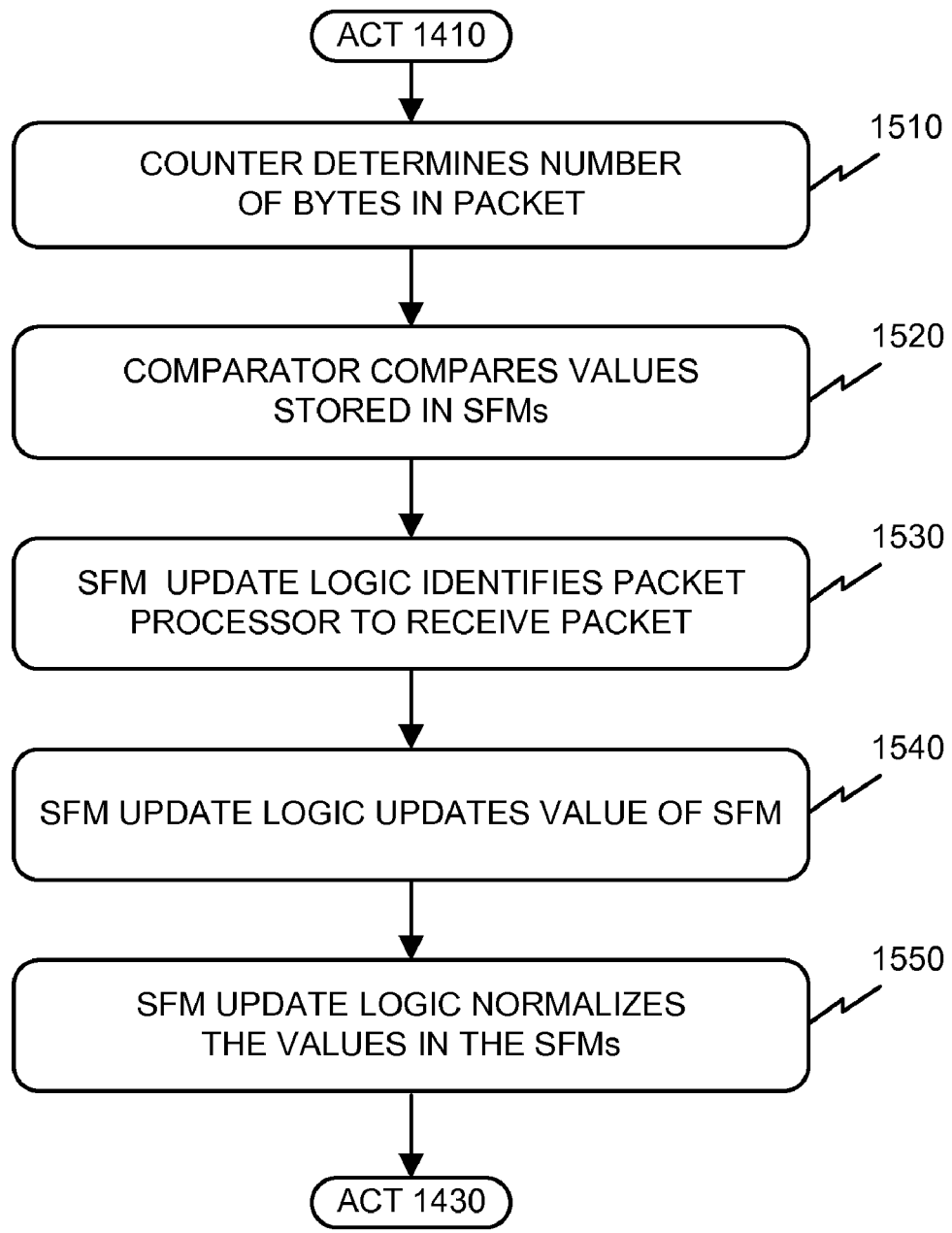
FIG. 15 is an exemplary flowchart of packet processing by the sprayers to balance the load given to each of the packet processors in an implementation consistent with the present invention.

FIG. 15 is an exemplary flowchart of packet processing by the sprayers 310 to balance the load given to each of the packet processors 320. The processing will be described in terms of a single sprayer 310. The other sprayers 310 may perform similar processing.

The counter 1030 (FIG. 10) may count the number of bytes in a received packet [act 1510]. Meanwhile, the comparator 1020 may read the values stored in the SFMs 1010 and compare them [act 1520]. The SFM update logic 1040 identifies the packet processor 320 (or transmit interface 650) to receive the packet based on the comparison by the comparator 1020 [act 1530]. In an implementation consistent with the present invention, the SFM update logic 1040 selects the SFM 1010 with the lowest value. In this case, the SFM 1010 with the lowest value may correspond to a packet processor 320 that has received the least number of bytes of packet data.

The SFM update logic 1040 may then update the value of the SFM 1010 that corresponds to the packet processor 320 to receive the packet (i.e., the SFM 1010 with the lowest value) [act 1540]. To update the value in the SFM 1010, the SFM update logic 1040 may add to it the number of bytes in the packet. The SFM update logic 1040 may, alternatively, use other updating techniques. The SFM update logic 1040 may then normalize the values in the SFMs 1040 [act 1550]. One normalization technique may involve identifying the lowest value stored by the SFMs 1010 and subtracting this lowest value from the values in all of the SFMs 1010. As a result, at least one of the SFMs 1010 may store a value of zero after normalization.

Returning to FIG. 14, the transmit controller 640 sends the packets to the appropriate transmit interfaces 650 [act 1420]. The transmit interfaces 650 may then transmit the packets to the corresponding packet processors 320 [act 1430].

Returning to FIG. 12, the packet processors 320 receive the packets and process them to identify the desprayers 330 and, more particularly, the transmit interfaces 1150 (FIG. 11) to receive the packets [act 1230]. The packet processors 320 may consult routing and/or forwarding tables to determine how to route the packets. The packet processors 320 may then send the processed packets to the desprayers 330 [act 1240]. The packet processors 320 may attach identifiers to the packets to facilitate their transmission from the router 300. The desprayers 330 receive the packets and transmit them on the outgoing packet streams, as instructed by the packet processors 320 [act 1250]. The desprayers 330 may use the identifiers to determine which transmit interfaces 1150 are to transmit the packets.

Exemplary Processing for Preserving Order of Packets

As described above, a concern with any router system is to maintain the order of packets. The theory is that packets should be transmitted from the router in the same order in which they were received by the router. The load balancing scheme described above maintains a high level of order consistency. Nevertheless, additional measures may be taken to assure that the order of packets remain the same through the router 300.

Figure 16:
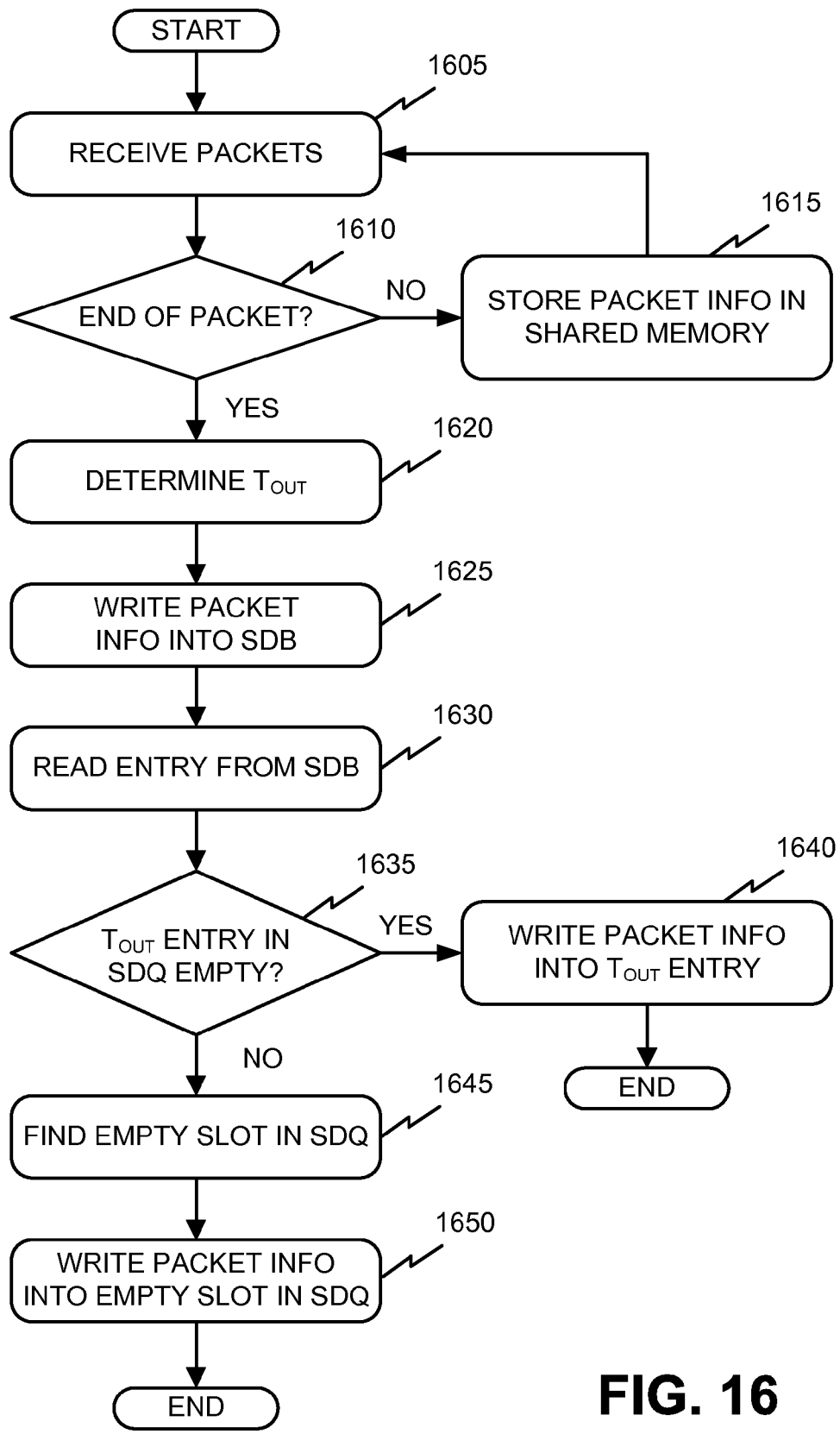
FIGS. 16 and 17 are exemplary flowcharts of processing for maintaining the order of packets according to an implementation consistent with the present invention.
Figure 17:
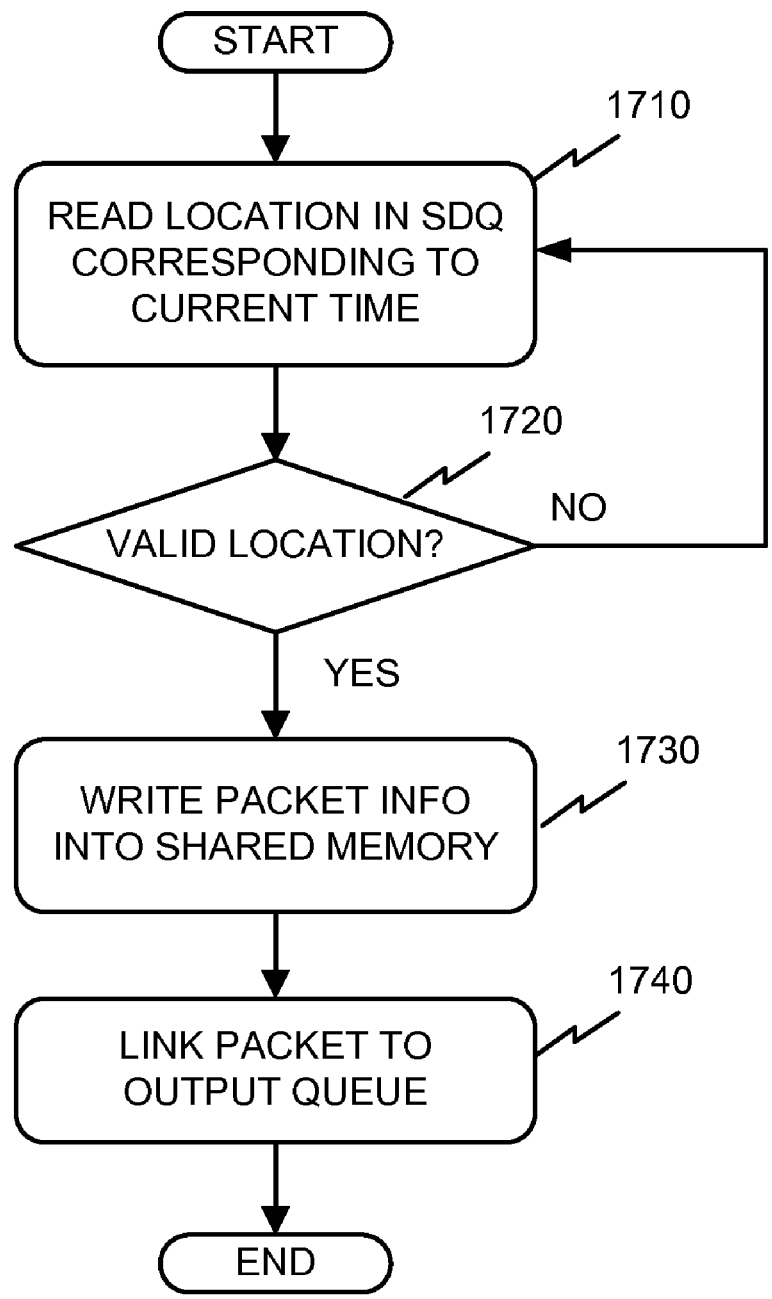

FIGS. 16 and 17 are exemplary flowcharts of processing for preserving the order of packets according to an implementation consistent with the present invention. The processing will be described in terms of a single sprayer 310. Other sprayers 310 and the desprayers 330 may perform similar processing.

The receive interfaces 610 (FIG. 6) may receive packets on the incoming packet streams [act 1605]. The scheduler within the receive controller 620 may be notified of the packets and may determine whether the end of any of the packets has been received [act 1610]. The scheduler may make this determination by analyzing certain fields in the packets. If the receive interfaces 610 have not yet received the end of the packets, the scheduler may store the packets in shared memory 630 [act 1615]. As described above, the packets may be divided into cells and stored in different cell memories within the shared memory 630.

If the end of a packet has been received, the scheduler may determine the dispatch time $T_{OUT}$ (i.e., the time at which packet transmission on the outgoing packet stream is to begin) for the packet and may store the packet information in the scheduling data buffer 672 [acts 1620 and 1625]. The scheduler may use different techniques for determining $T_{OUT}$. One technique derives $T_{OUT}$ from a time stamp of the beginning of the packet. In this case, $$T_{OUT} = T_{IN} + C_i - \frac{L}{W_B},$$

where $T_{IN}$ is the time at which the first byte of the packet arrived at the receive interface 610, $C_i$ is a constant selected to be approximately equal to, or greater than, the sum of time intervals for a large-sized packet to be transmitted by the receive interface 610 and the transmit interface 650, L is the length of the packet in bytes, and $W_B$ is the bandwidth of the outgoing packet stream in bytes/time unit.

In particular, the smallest value of $C_i$ may be given by:

$$C_i = \frac{L_L}{W_B} + \frac{L_L}{W_P},$$

where $L_L$ is the length of a large-sized packet and $W_P$ is the bandwidth of the incoming packet stream. The value of $C_i$ may be chosen so that the sprayer 310 can receive an entire large-sized packet before sending it out.

According to this technique, the scheduler may schedule a large-sized packet for transmission as soon as the end of the packet is received. The scheduler may hold small-sized packet in shared memory 630 for a time that is approximately equivalent to the time that an imaginary large-sized packet would have remained in the sprayer 310 before being transmitted.

Another technique derives $T_{OUT}$ from a time stamp of the end of the packet. In this case, $$T_{OUT} = t_{IN} + C_i - L\left(\frac{1}{W_P} + \frac{1}{W_B}\right),$$

where $t_{IN}$ is the time stamp of the end of the packet.

Every cycle, the scheduler may read the top entry from the scheduling data buffer 672 and check whether the corresponding $T_{OUT}$ entry in the scheduling data queue 674 is empty [acts 1630 and 1635]. If it is empty, the scheduler may write the packet information into the $T_{OUT}$ entry in the scheduling data queue 674 [act 1640]. If the $T_{OUT}$ entry is not empty, meaning that another packet is already scheduled to be transmitted at that time slot, the scheduler may search entries forward in time until an empty entry is found [act 1645]. The scheduler may then store the packet information in the empty entry [act 1650]. During this time, the scheduler may store all arriving packets in the scheduling data buffer 672.

On each dispatching time slot (e.g., every two cycles), the scheduler may read the location that corresponds to the current time stamp from the scheduling data queue 674 [act 1710] (FIG. 17). The scheduler may then determine whether the location is valid (e.g., whether the location includes packet information) [act 1720]. If the location does not include packet information, the scheduler may wait until the next dispatching time slot and read another location in the scheduling data queue 674.

If the location includes packet information, the scheduler may store the packet information in shared memory 630 and link it to the other packet information, as described above [act 1730]. The scheduler may then link the packet to the appropriate logical output queue in the shared memory 630 [act 1740]. The scheduler may do this by simply changing the pointer of the last packet in the output queue to point to the packet.

CONCLUSION

Systems and methods, consistent with the present invention, provide mechanisms for allocating bandwidth among packet processors in a router to increase the amount of bandwidth the router is capable of handling and maintain the order of the packets.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the routers 100, 200, and 300 have been described in terms of hardware elements, the functions of at least some of these elements may be implemented in software in other implementations consistent with the present invention.

The scope of the invention is defined by the claims and their equivalents.

What is claimed is:

1. A device comprising:
a plurality of stream flow meters corresponding to a plurality of packet processors, where each of the plurality of stream flow meters is to:
store a value relating to a number of bytes of packet data assigned to a corresponding one of the plurality of packet processors;
a comparator to:
compare the values in the plurality of stream flow meters, and
identify a stream flow meter, of the plurality of stream flow meters, storing a lowest value, of the values stored by the plurality of stream flow meters; and
a processor to:
assign at least one packet, from an incoming packet stream, to a packet processor, of the plurality of packet processors, corresponding to the identified stream flow meter to balance the number of bytes of the packets assigned, respectively, to the plurality of packet processors,
update the value stored by the identified stream flow meter based on a number of bytes associated with the assigned at least one packet, and
normalize the values stored by the plurality of stream flow meters after updating the value stored by the identified stream flow meter.

2. The device of claim 1, further comprising:
a counter to count a number of bytes in each packet on the incoming packet stream.

3. The device of claim 1, further comprising a flow control module that includes the plurality of stream flow meters, the comparator, and the processor.

4. The device of claim 3, where the incoming packet stream includes a plurality of incoming packet streams, the flow control module includes a plurality of flow control modules, and the plurality of flow control modules balance a number of bytes of packet data that is transmitted, respectively, to the plurality of packet processors for each of the plurality of incoming packet streams.

5. The device of claim 1, where, when normalizing the values in the plurality of stream flow meters, the processor is further to:
subtract the updated value stored by the identified stream flow meter from the values stored, respectively, by the plurality of stream flow meters.

6. The device of claim 1, further comprising:
a transmit interface to transmit the assigned at least one packet to the packet processor corresponding to the identified stream flow meter.

7. The device of claim 6, further comprising:
at least one receive interface to receive the at least one packet from the at least one incoming packet stream.

8. The device of claim 7, further comprising:
a memory to store the at least one packet received by the at least one receive interface.

9. The device of claim 8, further comprising:
a transmit controller to:
read the stored at least one packet from the memory, and
determine the transmit interface from a plurality of transmit interfaces associated with the device.

10. A method comprising:
storing, in a plurality of stream flow meters associated with a device, values relating to a number of bytes of packet data assigned, respectively, to a plurality of packet processors associated with the plurality of stream flow meters;
comparing, by the device, the values stored by the plurality of stream flow meters;
identifying, by the device, a stream flow meter, of the plurality of stream flow meters, storing a lowest value of the plurality of values;
assigning, by the device, at least one packet, from an incoming packet stream, to a packet processor, of the plurality of packet processors, associated with the identified stream flow meter to balance a number of bytes of the packets assigned to the plurality of packet processors;
updating, by the device, the value stored by the identified stream flow meter based on the number of bytes of the at least one packet assigned to the associated packet processor; and
normalizing, by the device, the values stored by the plurality of stream flow meters after updating the value stored by the identified stream flow meter.

11. The method of claim 10, further comprising:
counting the number of bytes in each packet on the incoming packet stream.

12. The method of claim 10, where normalizing the values stored by the plurality of stream flow meters further comprises:
subtracting the updated value stored by the identified stream flow meter from the values stored by the plurality of stream flow meters.

13. The method of claim 10, further comprising:
transmitting the assigned at least one packet to the packet processor associated with the identified stream flow meter.

14. The method of claim 13, further comprising:
receiving the at least one packet from the at least one incoming packet stream.

15. The method of claim 14, further comprising:
storing the at least one packet received by the at least one receive interface.

16. A system comprising:
an interface to receive an incoming packet stream; and
a flow control module to:
store a plurality of values relating, respectively, to a number of bytes of packet data assigned to a corresponding plurality of packet processors,
compare the stored plurality of values,
identify, based on comparing the plurality of stored values, a lowest value of the plurality of stored values,
assign at least one packet from the incoming packet stream to one of the plurality of packet processors that corresponds to the identified lowest value to balance the number of bytes of packet data assigned, respectively, to the packet processors,
update the lowest value based on a number of bytes associated with the assigned at least one packet, and
normalize the stored plurality of values based on updating the lowest value.

* * * * *